(12) United States Patent
Hill

(10) Patent No.: US 8,387,567 B1
(45) Date of Patent: Mar. 5, 2013

(54) HUMMINGBIRD FEEDING APPARATUS

(76) Inventor: David S. Hill, San Antonio, TX (US)

( * ) Notice: Subject to any disclaimer, the term of this patent is extended or adjusted under 35 U.S.C. 154(b) by 0 days.

(21) Appl. No.: 13/092,285

(22) Filed: Apr. 22, 2011

Related U.S. Application Data

(60) Provisional application No. 61/326,736, filed on Apr. 22, 2010.

(51) Int. Cl.
*A01K 7/06* (2006.01)

(52) U.S. Cl. ......................................................... 119/72

(58) Field of Classification Search .................... 119/72, 119/72.5, 75, 76, 77, 65, 57.8, 430, 434, 119/435
See application file for complete search history.

(56) References Cited

U.S. PATENT DOCUMENTS

| | | | |
|---|---|---|---|
| 3,125,069 A * | 3/1964 | Fowler | 119/77 |
| 3,990,403 A * | 11/1976 | Jacobs | 119/72.5 |
| 4,558,662 A * | 12/1985 | Peterson | 119/77 |
| 5,353,742 A * | 10/1994 | Mauritz | 119/77 |
| 6,712,236 B1 | 3/2004 | McGill | |
| 7,093,562 B2 | 8/2006 | Smothers | |
| 7,156,050 B2 * | 1/2007 | Scott et al. | 119/431 |
| 7,565,881 B2 * | 7/2009 | Smothers | 119/72 |
| 7,748,347 B2 * | 7/2010 | Richmond | 119/72 |
| 7,958,845 B2 * | 6/2011 | Gardner | 119/77 |
| 2003/0026164 A1 | 2/2003 | Klein | |
| 2005/0126503 A1 | 6/2005 | Fort | |
| 2005/0139645 A1 | 6/2005 | Shean et al. | |
| 2006/0037544 A1 | 2/2006 | Hunter | |
| 2009/0188434 A1 | 7/2009 | McMullen | |
| 2009/0283046 A1 | 11/2009 | Black | |
| 2010/0192866 A1 | 8/2010 | McMullen | |

OTHER PUBLICATIONS

Wikipedia; "Aseptic processing"; May 14, 2009; Wikipedia.org.
USA HARDWARE.COM; "Homestead Traditional Gem Disposable Humming bird Feeder, 16 Oz Capacity (Case: 6 Units)"; 2009; USA Hardware, Minneapolis MN.
AMAZON.COM; "Bird Brain 15622 Happy Hummer Window Mounted Hummingbird Feeder—Crackle Glass—Aqua Blue"; http://www.amazon.com/Bird-Brain-15622-Mounted-Hummingbird/dp/B000ZMCTQQ; 2009.
Perky-Pet; "Original Instant Liquid Nectar Concentrate for Hummingbirds"; Perky-Pet Products Co., Denver, Colorado, 2006.
Homestead; "Nectar Gem Reusable Hummingbird Feeder"; Gardner Equipment Company, Inc., Homestead Div., Juneau, Wisconsin, 2003.
Capri-Sun; "Our Drinks—Product range and nutrition information—Capri-Sun"; 2010. http://capri-sun.co.uk/mums/product-info/index.php.
Nature and Home; "Hummingbird King"; Nature and Home; 2009. http://web.archive.org/web/20100417111928/http://www.natureandhome.com/_product_7 . . . .
Tetra Pak; "The Future of the Stand-up Pouch and the Evolution of Tetra Wedge Aseptic Fiber Pouch Into New Markets"; Tetra Pak Inc, Vernon Hills, IL ; Nov. 2004.
Homestead; "Nectar Gem Hummingbird Feeding System"; Gardner Equipment Company; 2008; http://web.archive.org/web/20090401105231/http://www.nectargem.com/.
Homestead; "Laboratory Study"; Gardner Equipment Company; 2009. http://web.archive.org/web/20090401070358/http://www.nectargem.com/study.html.

\* cited by examiner

*Primary Examiner* — Yvonne Abbott

(74) *Attorney, Agent, or Firm* — Carr LLP; Marcus Benavides

(57) ABSTRACT

A hummingbird feeding apparatus for use in providing feed formula to hummingbirds. This may be accomplished by providing a reservoir for holding ready to consume and preservative free nectar formula for hummingbirds. The reservoir may have an opening that is configured to couple to a dispensing member for delivering the formula to hummingbirds. The reservoir may have an attachment member on one end for placing the dispensing member in a hummingbird-accessible location.

10 Claims, 9 Drawing Sheets

HUMMINGBIRD FEEDING APPARATUS

CROSS-REFERENCE TO RELATED APPLICATIONS

This application relates to, and claims the benefit of the filing date of, U.S. provisional patent application Ser. No. 61/326,736 entitled APPARATUS FOR FEEDING BIRDS, filed Apr. 22, 2010, the entire contents of which are incorporated herein by reference for all purposes.

BACKGROUND OF THE INVENTION

The present invention relates to feeders for animals and, more particularly, to feeders for hummingbirds. Hummingbird feeders are a source of enjoyment for bird and nature enthusiasts. A hummingbird feeder is typically a reservoir that dispenses or makes available a food source to a hummingbird, namely nectar. Nectar typically comprises a sugar and water solution.

It is generally known that hummingbirds like fresh nectar. Generally, hummingbirds are creatures of habit, returning to a feeder that previously had a fresh nectar supply. Thus, there is an interest among hummingbird feeder users to maintain a constant fresh supply of nectar.

Problems with the hummingbird feeders arise when the nectar is not fresh. Stale nectar deters hummingbirds from returning to the same location. Stale nectar may make a hummingbird sick. Insects may be attracted to fresh or spoiling nectar, which may exacerbate or accelerate spoilage and bring further risks to the health of hummingbirds.

These problems have been addressed in different manners. Sterilization of the water, by pre-boiling or other sterilization methods, is one way to ensure that the nectar stays fresh longer. Also, periodic replacement of the nectar in the feeder, such as once a week in cooler climates, also helps to maintain a fresh supply of nectar.

Preservatives that deter microbial or bacterial growth within the nectar have also been utilized. Preservatives have the advantage of extending shelf life of nectar sold in containers. Some types of preservatives include citric acid, sodium citrate, citrate, sodium benzoate, sorbic acid, tartaric acid, potassium sorbate, and bezoic acid.

But preservatives may also deter hummingbirds from feeding from nectar in a feeder, because the preservative may change the flavor and/or consistency of the nectar from that expected from a sugar-water solution. Also, preservatives may affect the digestive system in a particular hummingbird, further deterring that hummingbird from returning to feed from the feeder.

In addition, periodic replacement of the nectar in the hummingbird feeder is typically cumbersome and time-consuming for the user, often requiring additional cleaning of the hummingbird feeder before reintroducing a clean hummingbird feeder with fresh nectar to the hummingbirds.

Therefore, a need exists for an invention that can maintain the sterility of a nectar solution in a ready to use configuration, which requires little or no cleaning to keep the nectar fresher for longer periods of time than conventional packaging. Further, a need exists for a system for delivering nectar to the consumer in a substantially sterile or preservative-free state that exceeds that found in conventional packaging for hummingbird nectar solution.

SUMMARY OF THE INVENTION

The present invention provides a hummingbird feeding apparatus having a reservoir for holding ready to consume and preservative free nectar formula for hummingbirds. The reservoir has an opening that is configured to couple to a dispensing member for delivering the formula to hummingbirds. The reservoir has an attachment member on one end for placing the dispensing member in a hummingbird-accessible location.

BRIEF DESCRIPTION OF THE DRAWINGS

For a more complete understanding of the present invention and the advantages thereof, reference is now made to the following Detailed Description taken in conjunction with the accompanying drawings, in which:

FIG. 2D is a top view of the second configuration of hummingbird feeding apparatus;

DETAILED DESCRIPTION

In the following discussion, numerous specific details are set forth to provide a thorough understanding of the present invention. However, those skilled in the art will appreciate that the present invention may be practiced without such specific details. Additionally, for the most part, specific details and the like have been omitted inasmuch as such details are not considered necessary to obtain a complete understanding of the present invention, and are considered to be within the understanding of persons of ordinary skill in the relevant art.

Figure 1:
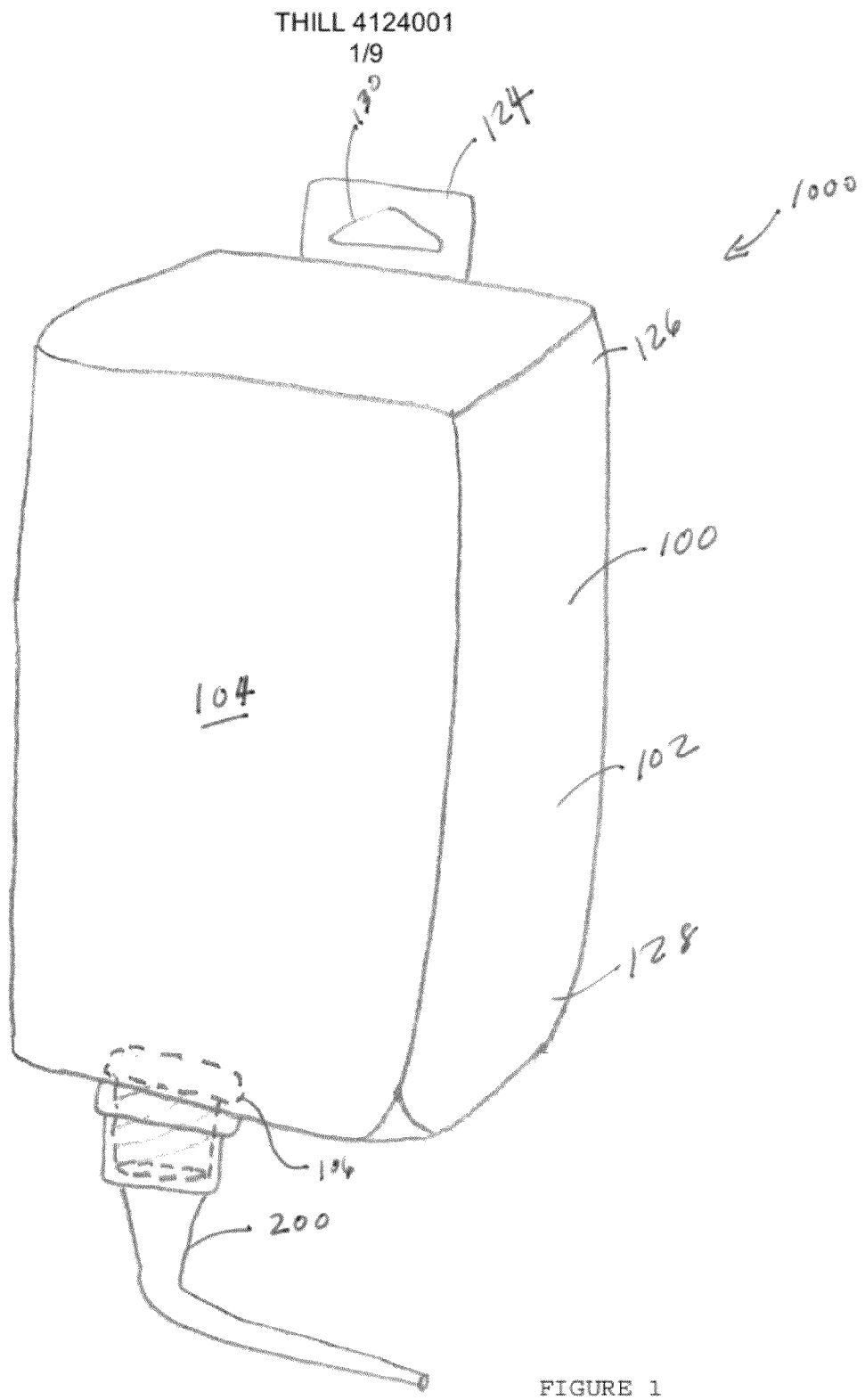
FIG. 1 is a perspective view of a first configuration of a hummingbird feeding apparatus.
Figure 2A:
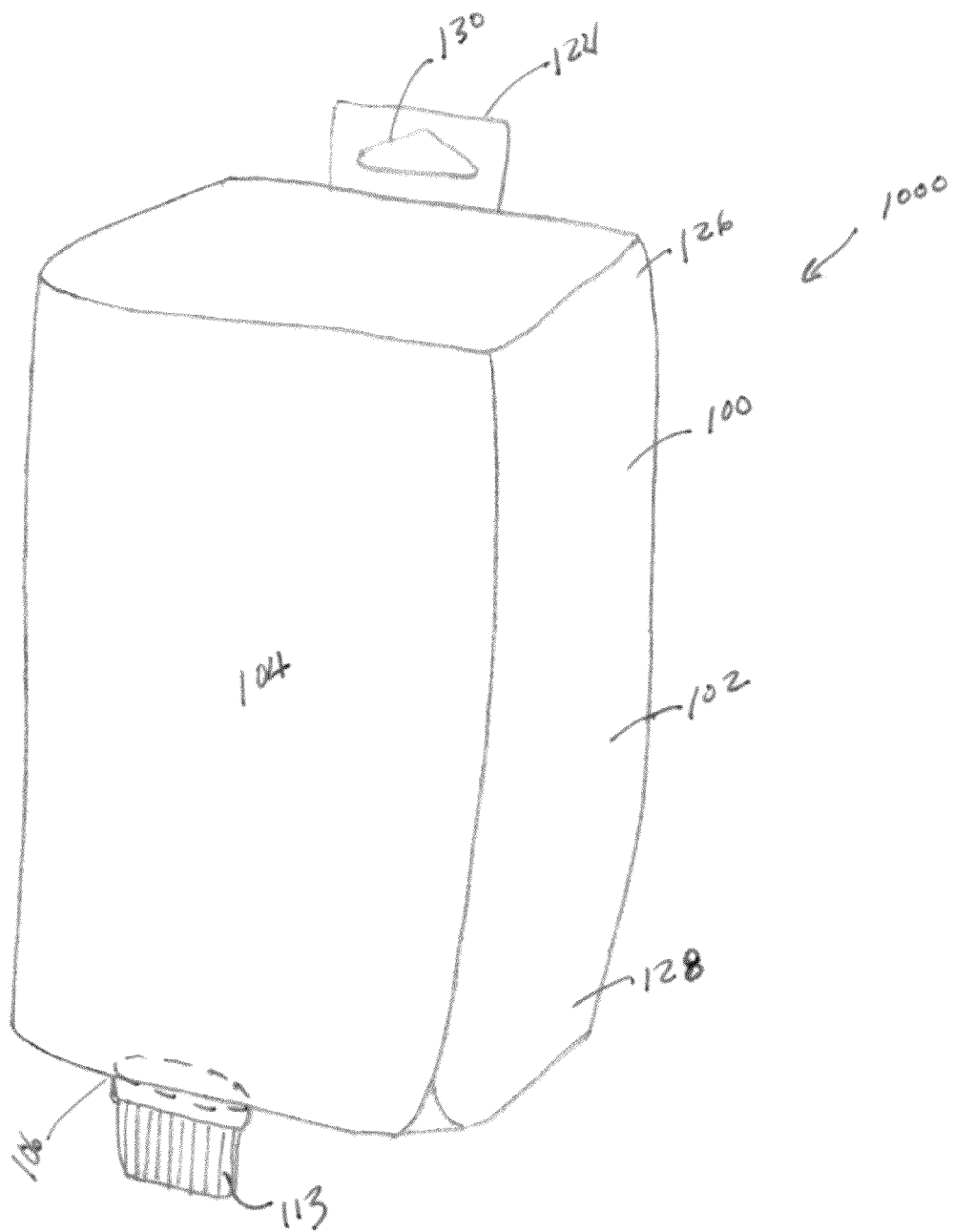
FIG. 2A is a perspective view of a second configuration of hummingbird feeding apparatus having a nozzle member removed.

As shown in FIG. 1, a feeding apparatus 1000 for feeding a bird or other animals may comprise a feeder 100 containing a formula adapted for feeding birds or other animals. The feeder 100 may be configured to couple to a dispensing member 200 for dispensing the formula to birds or animals. In some embodiments, the formula may be ready for consumption, without requiring the addition of any further materials, such as water, sugar or other ingredients. As shown in FIG. 2A, the feeder 100 may have a cap member 113 that may cover an opening 106 in the feeder 100.

The feeder 100 may comprise an aseptic or sterile enclosure having walls 102 forming a reservoir 104. The formula may be aseptically filled and packaged in the feeder 100 prior to arriving to the consumer. The formula may have been previously sterilized and aseptically packaged in the feeder 100 for storage in an aseptic environment, at least until one or more seals on the feeder are broken to dispense the formula to birds or other animals. For instance, the formula may be vacuum-packed in a microbe-free and sterile packing environment into an aseptic feeder for keeping the formula fresh for an extended period of time, for instance two years.

An aseptic or sterile enclosure may comprise a reservoir that contains a sterile product stored in a sterile container. The sterile product, such as hummingbird formula, is stored to maintain its sterility for an extended period of time to extend the shelf life of the product, where sterility may be defined as the condition of the product being substantially microbe and disease-free. The reservoir 104 of the feeder 100 shown in FIG. 1 may have walls 102 comprising layers of a combination of paper, plastic, foil, like aluminum foil, or other suitable materials.

Figure 2B:
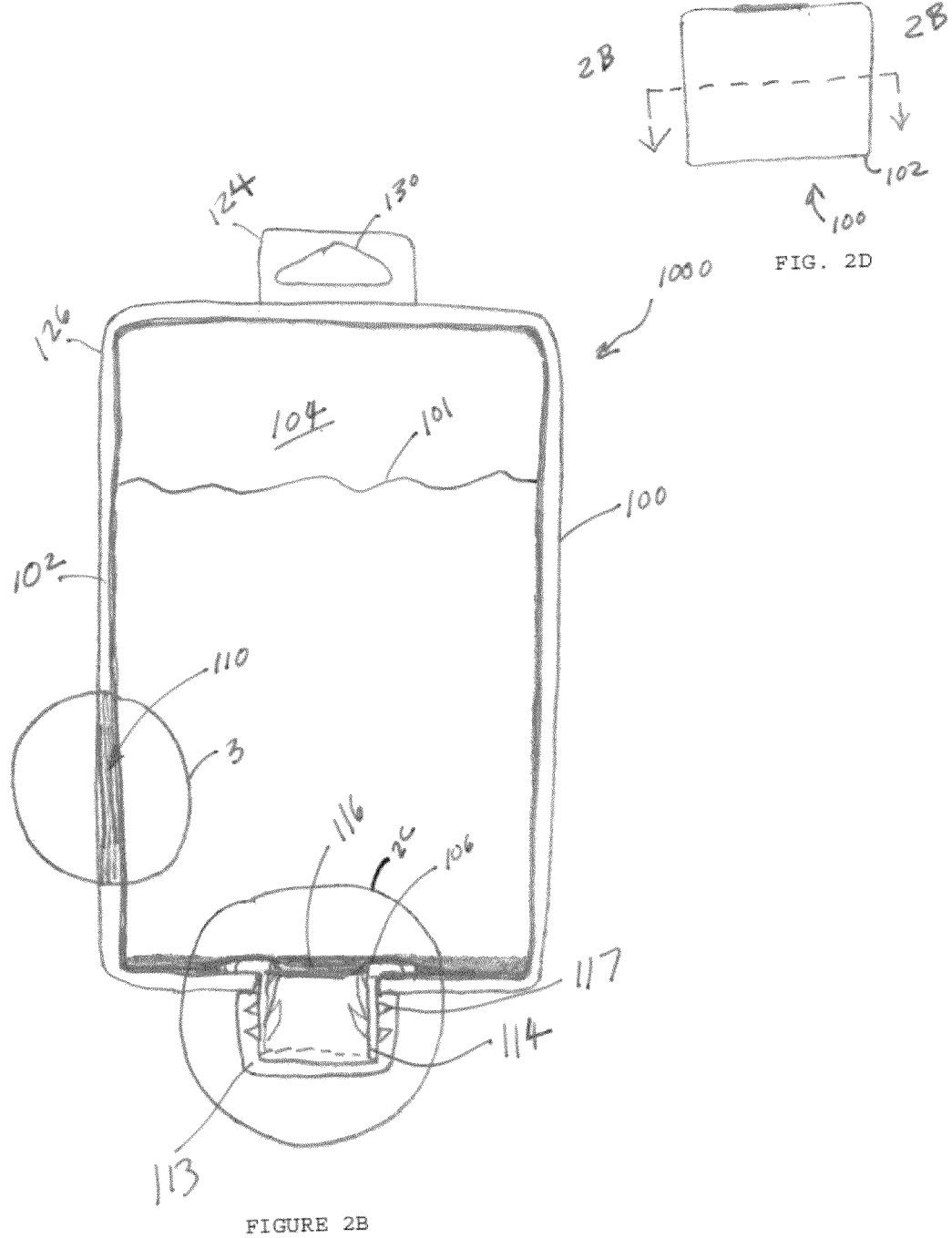
FIG. 2B is a cross-sectional view of a second configuration of hummingbird feeding apparatus taken along line 2B-2B, shown in FIG. 2D.
Figure 2C:
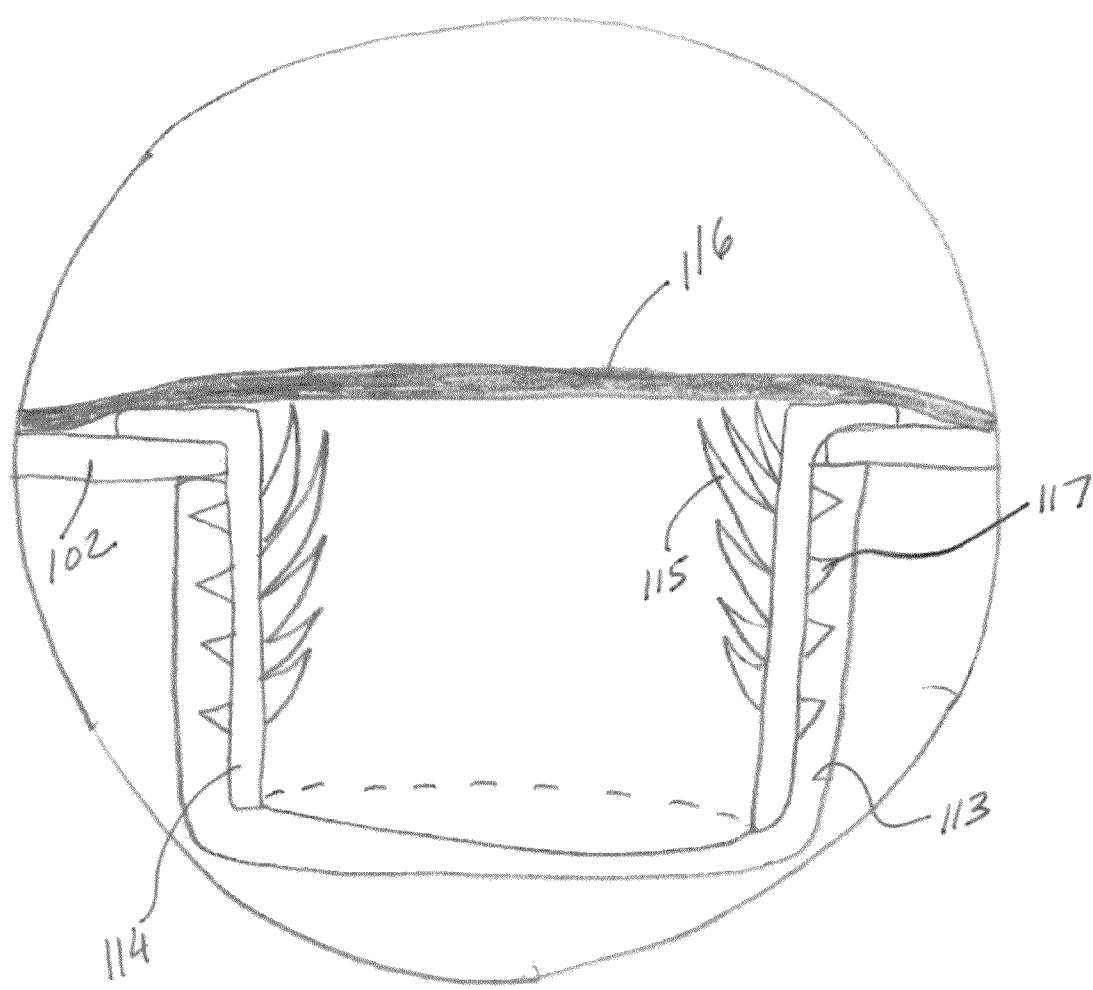
FIG. 2C is a close-up view of section "2C" shown in FIG. 2B.
Figure 3:
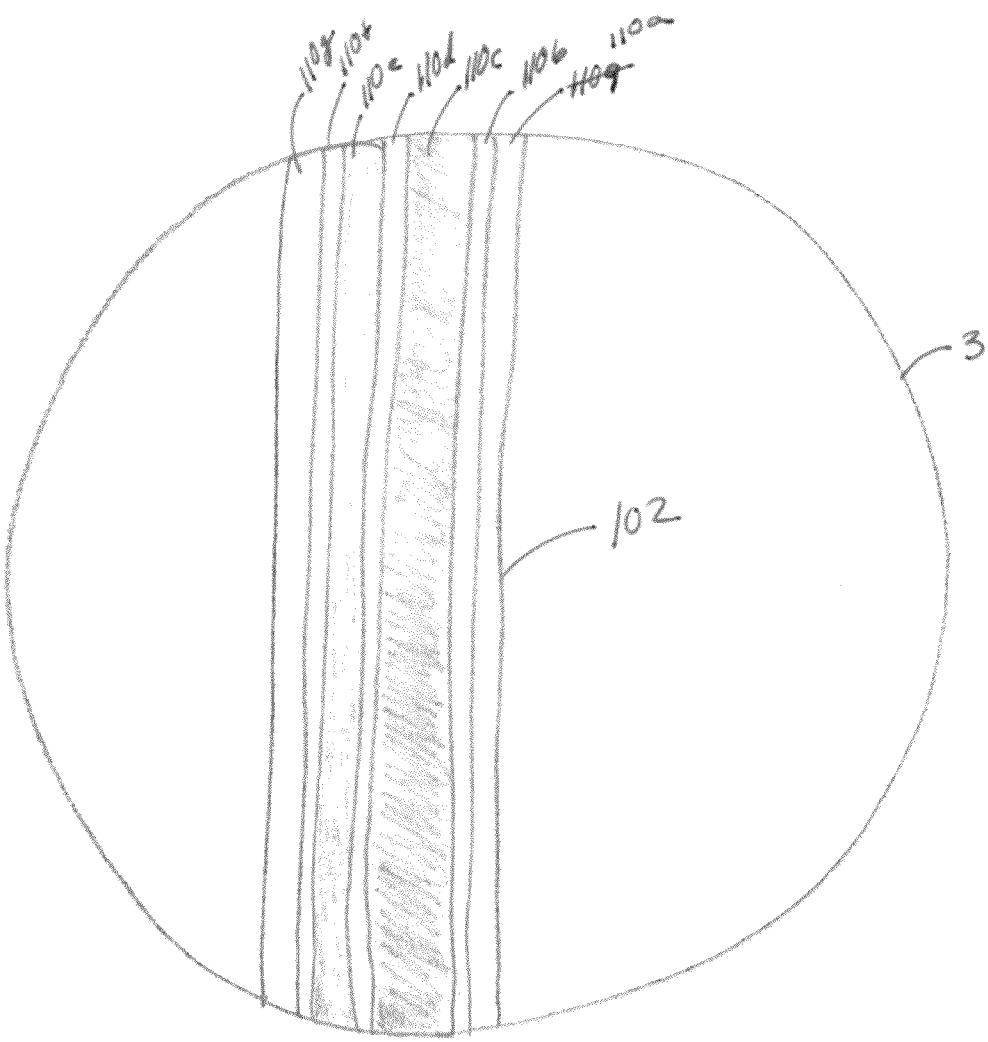
FIG. 3 is a close-up view of section "3" shown in FIG. 2B, showing layers in walls of a feeder.

As shown in FIGS. 2B and 3, the walls of the feeder 100 may comprise one or more layers 110 that accomplish and promote longer shelf life by protecting the contents from contaminants like microbes, bacteria, moisture, oxygen, light, and flavor. The reservoir 104 of the feeder 100 may be constructed according to the processes and manufacturing techniques of the aseptic packages produced by Tetra Pak Inc. of Vernon Hills, Ill., for instance under the registered trademark Tetra Prisma®.

The walls 102 may include a series of one or more layers 110 including, but not limited to, those shown in FIGS. 2B and 3. As shown in FIG. 3, these layers 110 may include a combination of one or more of a polyethylene layer 110a for sealing in the nectar formula 101, shown in FIG. 2A, a first polyethylene adhesion layer 110b, an aluminum foil layer 110c, a second polyethylene adhesion layer 110d, a paperboard layer 110e for providing structural stability and strength to the feeder and define an enclosed volume as a reservoir, a printed design and artwork layer 110f for labeling the feeder, and a second polyethylene layer 110g to protect the reservoir from external moisture.

In some embodiments, the layers 110 of the feeder 100 may comprise flexible materials that may be folded into a closed shape to configure the layers 110 to define a reservoir for holding nectar solution. One advantage of using flexible materials for the layers 116 may be that it allows for high-speed manufacturing, which may lower overall production costs.

It is expected that at least one layer of the walls 102 may comprise a substantial barrier to one or more of microbes, bacteria, moisture, oxygen, light or flavor. The layer 110c may comprise a low density metal, such as aluminum, that resists corrosion and provides a substantial barrier to light, oxygen and flavor. In the embodiment shown, the aluminum foil layer 110c may substantially prevent light from entering the reservoir to impact the nectar contained in the feeder 100. Preventing light from impacting the nectar may retard microbial growth within the reservoir 103, which may significantly extend the shelf-life of the nectar formula 101.

In is further expected that the aluminum foil layer 110c may assist in extending the time that the nectar stays fresh after at least one seal in the feeder 100 is broken and the nectar in the reservoir is exposed, at least partially, to the outside environment. A consumer may purchase the feeder 100 in a substantially sealed condition with the feeder 100 sealed by at least one seal, such as first sealing member 116, described below. After the seal is broken, the aluminum layer 110c may continue to substantially prevent light from impacting the nectar solution contained in the reservoir of the feeder 100, even though there may be some contamination as an expected part of breaking the seal. Therefore, the aluminum layer 110c and other suitable materials may maintain a substantially sealed condition, providing a relatively sterile environment, within the reservoir for a longer period of time, even after the seal of the feeder 100 is initially broken. In some embodiments, the dispensing member 200 may further assist in preventing contamination and stopping microbial growth by acting as at least a partial seal to entrance of air within the reservoir.

It will be understood other materials known by persons of ordinary skill in the art may be used in place of aluminum of layer 110c. These materials may accomplish substantially the same apparent benefits and advantages of aluminum, and may include tin, zinc, or other suitable material.

As shown in FIG. 2B, the feeder 100 may comprise an opening 106 on a bottom portion 13 of the feeder 100. The opening 106 may extend through the walls 102 of the feeder 100 allowing for nectar to be inserted or removed from the reservoir 104, in the absence of at least one seal that would close the opening 106.

A connection interface 112 may surround a portion of the opening 106 for coupling a dispensing member 200 to the feeder 100. The interface 112 may attach to and extend from the outside surface of the walls 102 of the feeder 100. The interface 112 may generally at least partially surround or enclose the opening 106, and may generally form a channel for connecting with a mouth of the interface 112 and the opening 106, shown in FIG. 1.

Figure 4A:
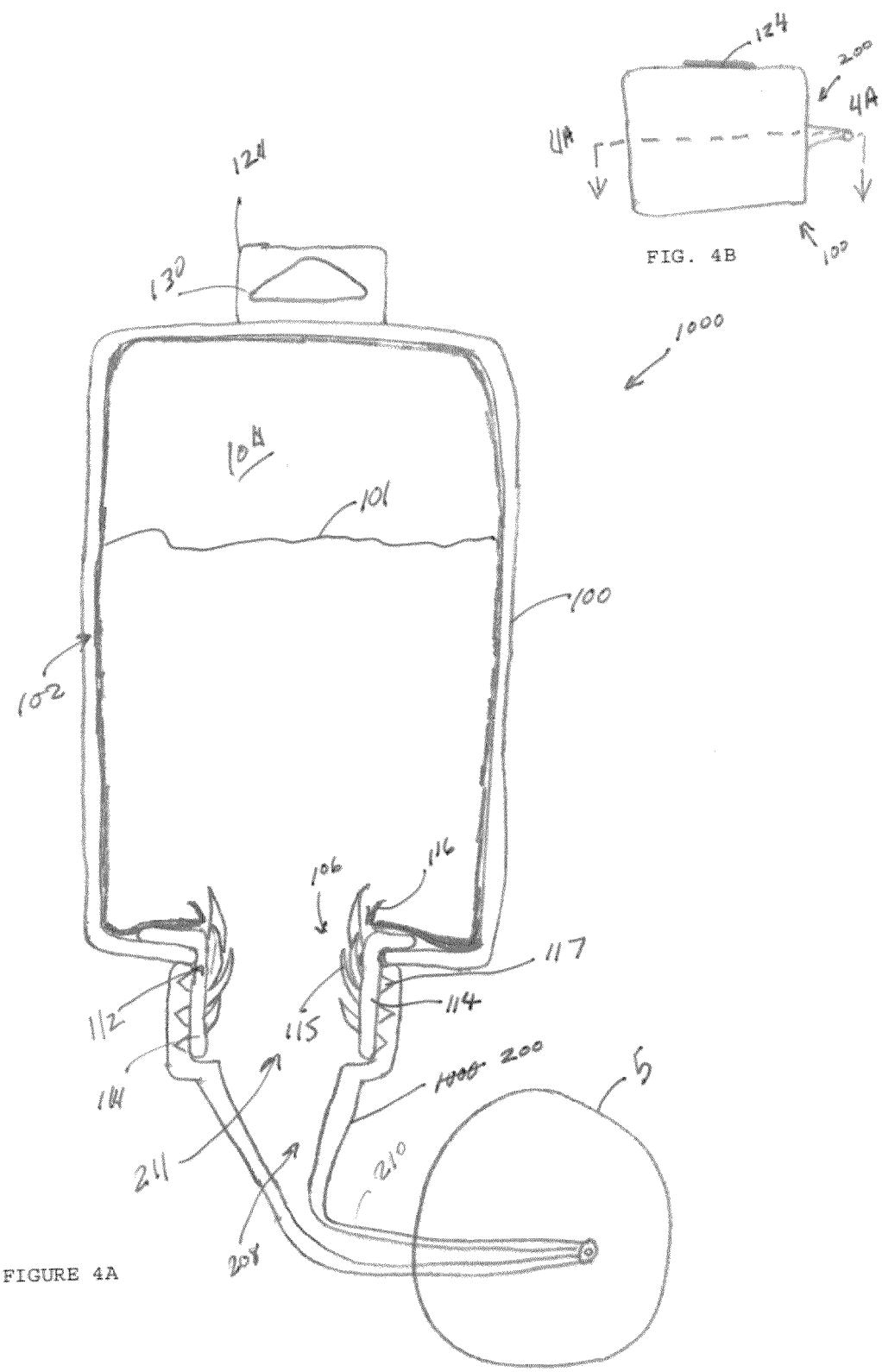
FIG. 4A is a cross-sectional view of a first configuration of a hummingbird feeding apparatus taken along line 4A-4A shown in FIG. 4B with the nozzle member coupled to the feeder.
Figures 4A, 4B:
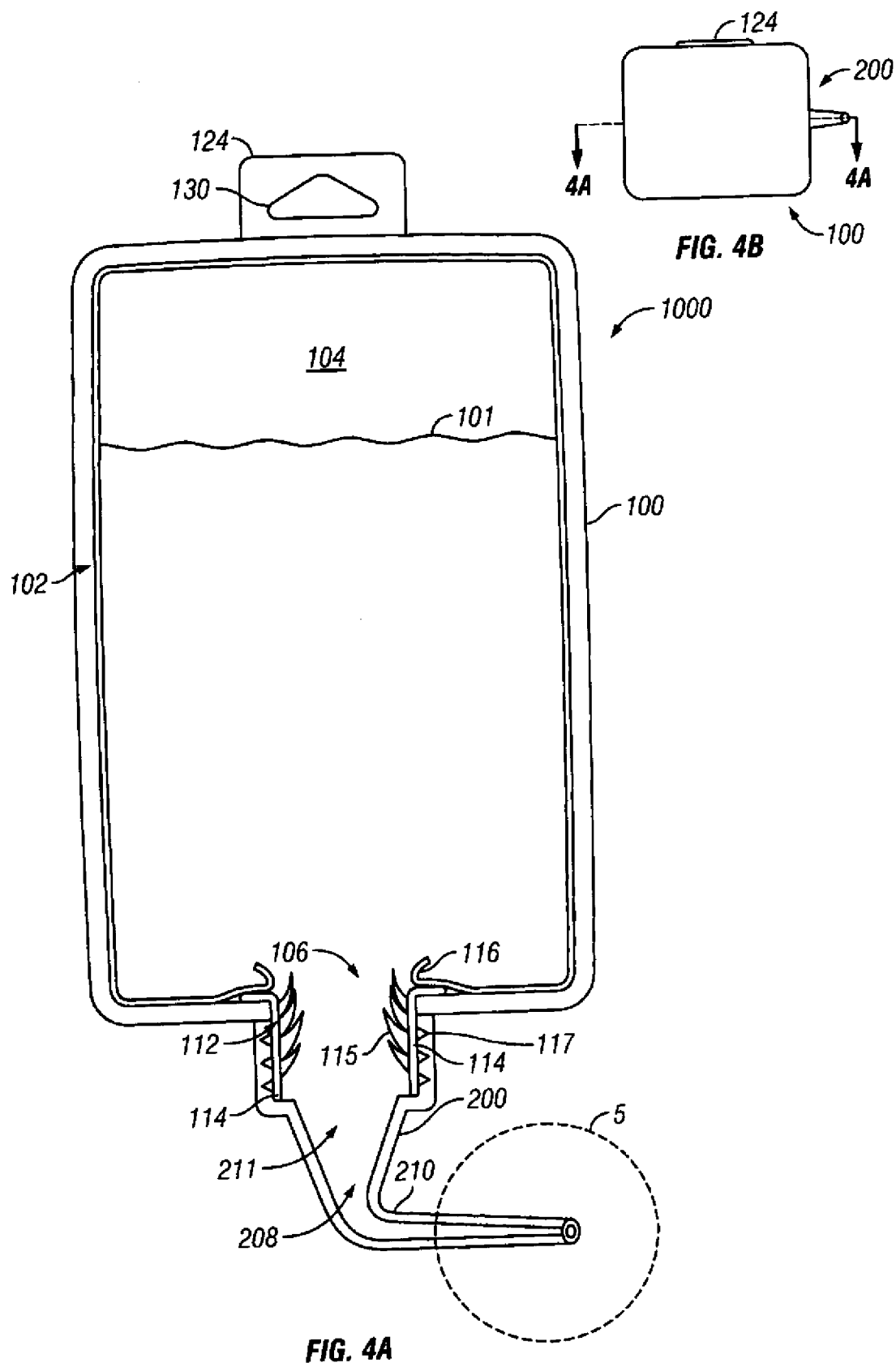
FIG. 4B is a top view of the first configuration of a hummingbird feeding apparatus.
Figure 5:
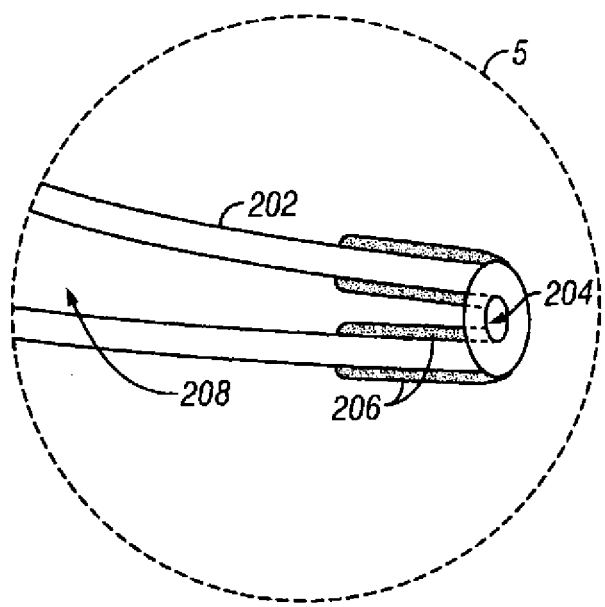
Figure 6:
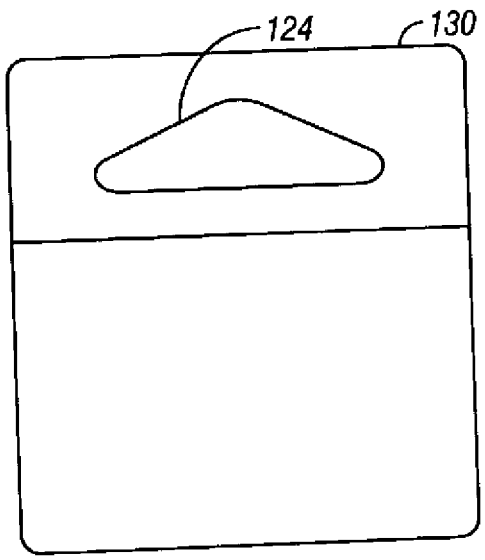
Figure 7:
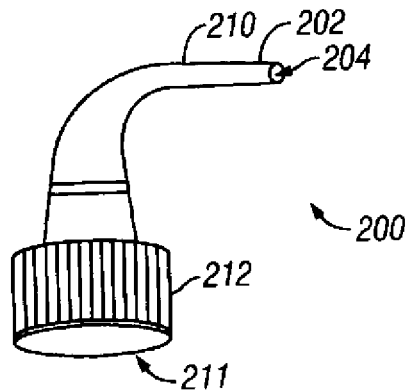
Figure 8:
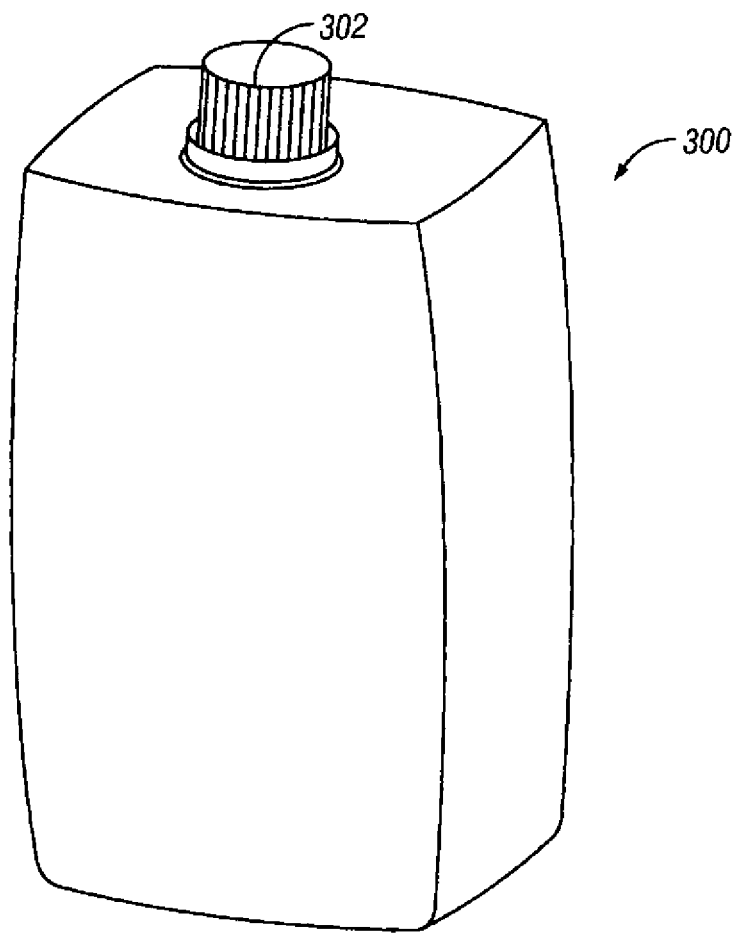

In the embodiment shown in FIGS. 2B and 4A, the interface 112 may comprise a boss 114 extending from the opening 106 having threading 117 on outside portions of the boss 114. The threading 117 may be configured to threadably couple to a cap member (shown in FIGS. 2A and 2B) or the dispensing member 200 (shown in FIG. 4) for allowing the nectar formula 101 to flow from the reservoir 104 through the interface 112 and to the dispensing member 200. The boss 114 may be manufactured from polypropylene or other suitable material. It will be understood by persons of ordinary skill in the art that the threaded coupling between the interface 112 and the dispensing member 200 may be interchanged with other structures and methods of coupling that will perform the same function as the threaded coupling, for instance snap or interference fits, latches, or clips.

The opening 106 may be sealed by a first sealing member 116. In the embodiment shown in FIG. 2B, the first sealing member 116 may cover the opening 106 to impede the flow of nectar formula 101 from the reservoir 104 through the interface 112 and to the dispensing member 200 and to at least partially seal the feeder from the outside environment, e.g. from air, light, bacteria, microbes, or animals. The first sealing member 116 may be configured to be breakable or removable to allow the consumer to open or unseal the feeder 100 for dispensing nectar formula 101 to birds or other animals.

Initially, the feeder 100 may be sealed from the outside atmosphere by the first sealing member 116. As shown in FIG. 2B, the first sealing member 116 may comprise a piece of aluminum foil, or other suitable material, extending from the walls 102 of the feeder 100 to cover the opening 106. In some embodiments, the first sealing member 116 comprises a portion of layer 110c that has been stripped of other layers 110 to expose the aluminum portion of walls 102.

The connection between the first sealing member 116 and the feeder 100 may be configured to allow the consumer to tear or break the first sealing member 116 from the feeder 100 with the application of a threshold level of pulling or puncturing force. The foil of the first sealing member 116 may be configured to be thin enough, as a membrane, to allow the consumer to puncture the membrane with application of a threshold level of piercing force. The boss 114 may at least partially cover and enclose both the opening 106 and the first sealing member 116 to prevent inadvertent displacement of the first sealing member 116.

A cap member 113 may couple to the boss 114 to substantially enclose both the opening 106 and the first sealing member 116 to prevent inadvertent displacement of the first sealing member 116. The cap member 113 may comprise a threaded sleeve that threadably engages the threading 117 on the boss 114. In some embodiments, the cap member 113 may be manufactured according to the methods and techniques of the StreamCap® (manufactured by TetraPak, Inc.). The cap member 113 may be made from polyethylene or other suitable material.

An opening member 115 on the cap member 113 may be configured to break the first sealing member 116 on the feeder 100 for the release of the formula from the reservoir. In some embodiments, the opening member 115 may be positioned on an inner surface of the boss 114. The opening member 115 may comprise teeth positioned on an inner surface of the boss 114 and configured to engage and break the first sealing member 116 on the interface 112, when the cap member is removed from threadable engagement with the threading 117 on the boss 114. In some embodiments, when the cap member 113 is turned in a counter clockwise direction the teeth of the opening member 115 may engage the first sealing member 116 to break the seal.

As shown in FIGS. 1, 2A, and 4, one or more attachment members, such as hanger members 124, may be coupled to a top portion 126 of the feeder 100 for connecting the feeder 100 to a hummingbird-accessible location. The hanger member 124, such as a tab, may be positioned on the top portion 126 of the feeder 100 generally opposite from the dispensing member 200, located generally on a bottom portion 128. The designations "top" and "bottom" are intended to signify that when in use the top portion 126 may be positioned higher relative to the local vertical than the bottom portion 128. Generally, the apparatus 1000 may be hung from a bird or animal accessible structure, like a tree outside, by a coupling between the hangar member 124 and a portion of the bird or animal accessible structure.

The hanger member 124 may be configured with an aperture 130 or hook (not shown) to receive or communicate with a hook member (not shown) on a bird or animal accessible structure for mounting the feeding apparatus 1000 in a place accessible to birds or other animals. The hangar member 124 is generally positioned on an opposite side of the feeder 100 from where the opening 106 is located for orienting the feeder 100 so that the dispensing member 200 is extending in a generally downward direction relative to the local vertical to allow gravity to assist in dispensing the formula from dispensing member 200. It will understood by persons of ordinary skill in the art that the aperture 130 of the hangar member 124, configured to receive a hook to couple the feeding apparatus 1000 to a bird or animal accessible structure, may be interchanged by other structures and methods that achieve the same function as an aperture, namely, for instance, latches, hooks, clips, nails, nut and bolts, suction cups and adhesives.

In some embodiments, the formula 101 contained in the feeder 100 comprises a ready to consume nectar solution of about 4 parts water and about 1 part sugar cane, specifically made to feed one or more hummingbirds. The feeder 100 may hold 500 ml of liquid and may comprise substantially an aseptic package manufactured by Tetra Pak Inc. of Vernon Hills, Ill. under the registered trademark Tetra Prisma®. In some embodiments, the formula 101 may be packaged without preservatives, which generally is a more attractive formulation for hummingbirds. The formula 101 may further be packaged without any other additives such as color. No further water or additives need to added to make the formula consumable for hummingbirds.

As discussed above and shown in FIG. 4A, the feeder 100 is intended to be used in an orientation that allows nectar formula 101 to flow by force of gravity out through the opening 106. As shown in FIG. 1, the feeder 100 may be hung from the attachment member 124 so that that the opening 106 generally is positioned to allow nectar formula 101 by force of gravity to flow out through the opening 106. A valve, such as the dispensing member 200, may regulate the flow of nectar formula 101 out of the reservoir 104.

In some embodiments, the feeder 100 may comprise properties or qualities that make the product consumer-disposable. For instance, the materials used may have a low cost in the market, the manufacturing may have a low assembly cost, and the overall product and contents may be considered environmentally-friendly.

Figure 7:
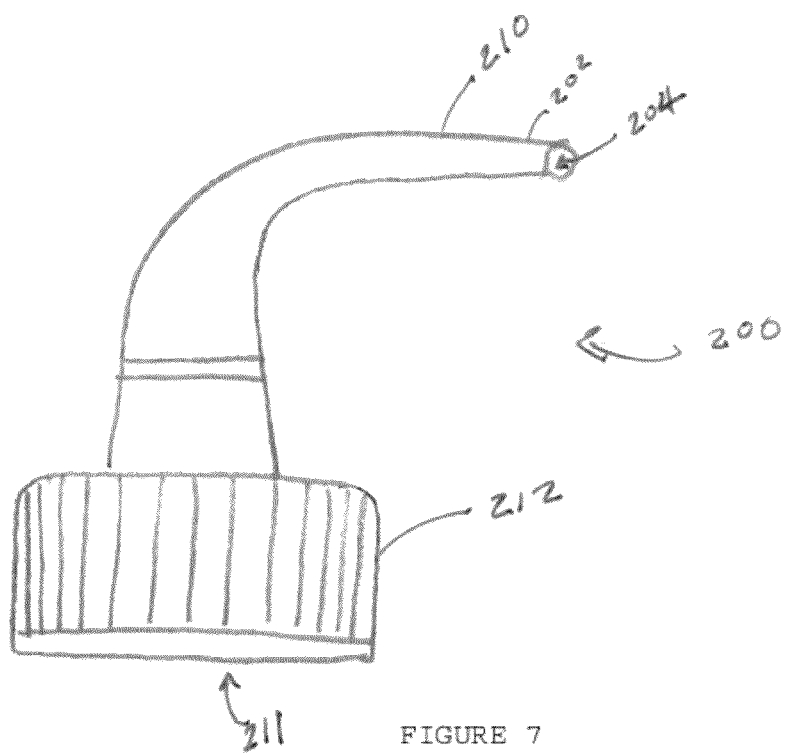
FIG. 7 is a front view of a nozzle member.

As shown in FIGS. 1, 4A, and 7, the feeder 100 may be configured to couple to a dispensing member 200 for dispensing the nectar formula stored in the reservoir 104 to hummingbirds, for instance. The dispensing member 200, shown in FIGS. 4A and 7, may function as a valve for regulating the flow of nectar solution out of the reservoir 104. In some embodiments, the dispensing member 200 may comprise a nozzle member 210 specifically engineered for dispensing the formula to a bird or other animal, and a connection member 212 for coupling the nozzle member 210 to the feeder 100. Threading on an inside surface of the connection member 212 may be designed or molded to threadably couple onto the connection interface 112 located around the opening 106 of the feeder 100. The connection member 212 may comprise a connection member opening 211 for providing an opening to allow nectar solution to flow from the opening 106 into the inner channel of the connection member 212. The nozzle member 210 may be manufactured from polypropylene or other suitable material.

Figure 5:
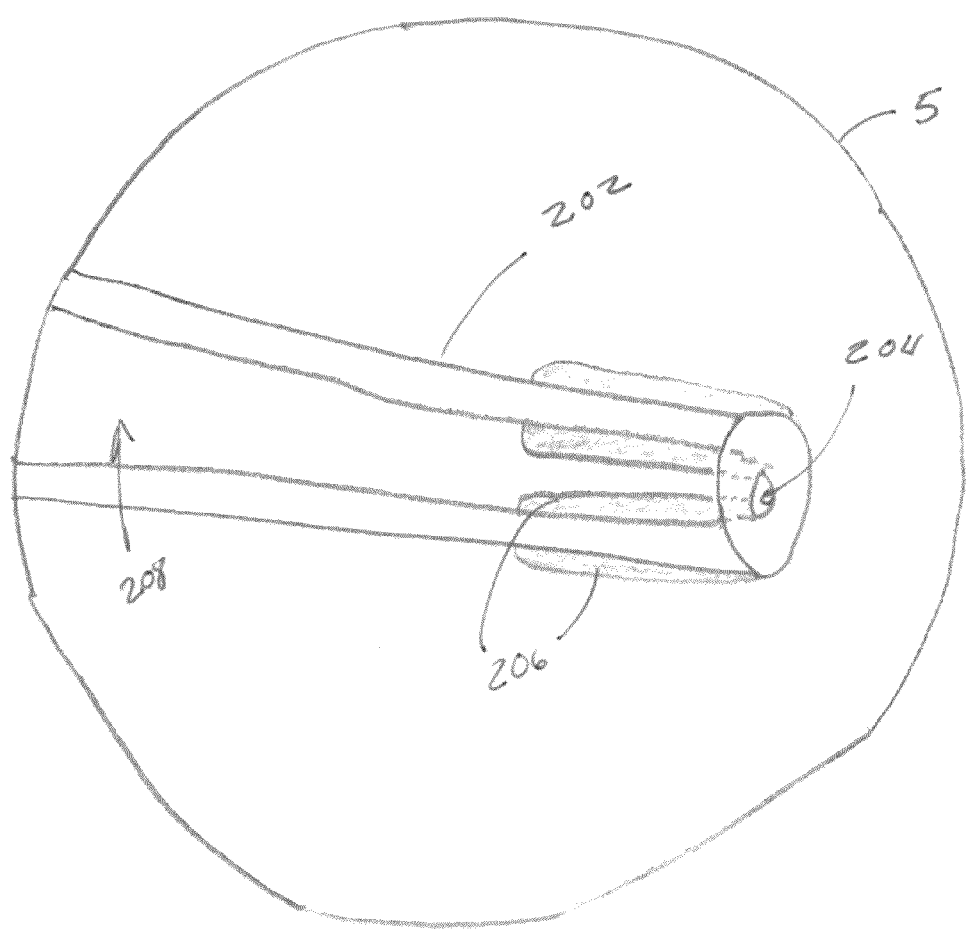
FIG. 5 is a close-up view of section "5" shown in FIG. 4A of a nozzle member.
Figure 6:
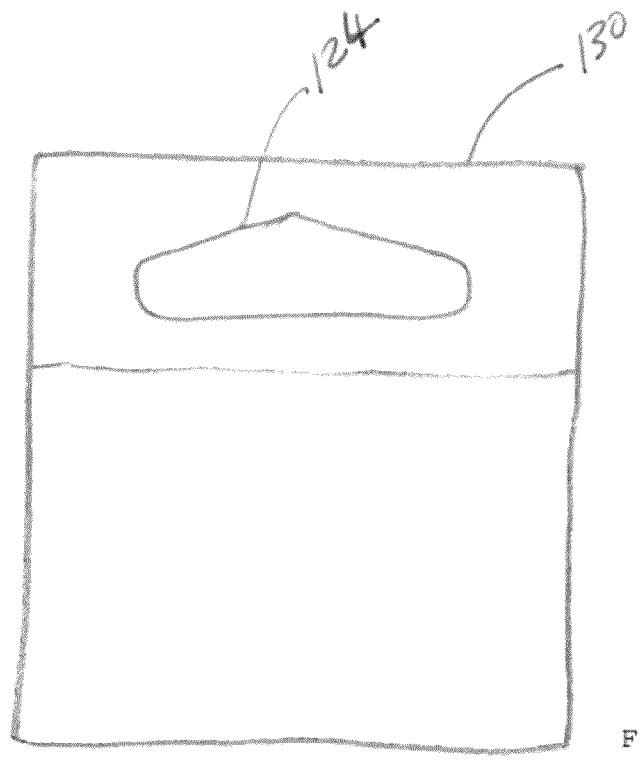
FIG. 6 is a front view of a hangar member.

As shown in FIGS. 4A and 5, the nozzle member 210 may comprise a tip portion 202 having a nozzle opening 204. A channel 208 between the connection member opening 211 and the nozzle opening 204 may provide a path for nectar solution to flow from the opening 106 of the feeder 100.

In some embodiments, inner surfaces of the nozzle opening 204 may be configured to prevent the flow of nectar solution, when the nozzle member 210 is in a non-actuated state, such as when a hummingbird is not presently attempting to feed from the nozzle member 210. The nozzle opening 204 may be configured with a size, shape, or other geometric feature designed to prevent the flow of nectar solution. For example, the size of the nozzle opening 204 may be configured to correspond with the expected flow properties, such as viscosity and thickness, of the nectar solution so that the nectar solution does not substantially drip out from the nozzle member 210 when a hummingbird is not drinking from the nozzle member 210. It should be understood by persons of ordinary skill that alternate techniques for preventing nectar solution from flowing through the nozzle opening 204, when the nozzle member 210 is undisturbed, may include use of a ball valve, or other suitable technique.

As shown in FIG. 5, the inside surfaces of the nozzle member 204 may be coated with hydrophobic material 206, for instance Teflon® (a trademark of DuPont of Wilmington, Del.). Use of material 206 as a coating may have the effect of preventing nectar solution from dripping out from the nozzle member 210 when the nozzle is substantially undisturbed by a hummingbird. Other hydrophobic materials, including silicon, may be used to prevent inadvertent flow of nectar solution from the nozzle member 210.

In some embodiments, the materials comprising the feeder 100 or the dispensing member 200, such as the layers 110, may have properties or qualities that make the feeder 100 consumer disposable. For instance, the materials used may have a low cost in the market, the manufacturing may have a low assembly cost, and the overall product and contents may be considered environmentally-friendly.

The feeder 100 and the dispensing member 200 may further comprise a one-use configuration. For instance, the dispensing member 200 may comprise a locking mechanism (not shown), which prevents removal of the dispensing member 200 without at least partial destruction of the dispensing member. A consumer therefore may be prevented from manually refilling the reservoir 104, without disabling the functionality of the apparatus 1000.

In some embodiments, the contents in the aseptic feeder 100 may be pressurized in some embodiments to form a vacuum seal or airtight seal at the aseptic seal.

The apparatus 1000 may be prepared for use by following one or more of these steps. First, the first sealing member 116 may be removed. In some embodiments, a cap member 113 may be turned to remove the cap member 113 from threadable engagement with the boss 114 to advance the opening member 115 to puncture the first sealing member 116 and provide for the flow of nectar solution from the reservoir. The cap member 113 may then be removed through further turning to disengage the cap member 113. Second, the dispensing member 200 may be attached to the interface 112 by threadably coupling the dispensing member 200 to the threading 117 on the boss 114, through rotation of the dispensing member 200. Third, the feeder 100 may be hung on a hook inserted into the aperture 130 of the hangar member 124. A hummingbird may then access the formula by disturbing the nozzle member 210 to release the formula. In some embodiments, when the nozzle member 210 is undisturbed by a hummingbird, a coating on the inner surfaces of the nozzle member 210 may substantially prevent inadvertent leakage of nectar formula in response to environmental disturbances, such as by wind or other unintended movements of the feeder 100 as it hangs.

A system 2000 for feeding birds may comprise a kit containing at least one feeder 100 containing formula for feeding birds or other animals, at least one dispensing member 200 configured to be removeably coupled to the at least one feeder, and at least one hangar member 124 configured for attachment to the feeder 100. In some embodiments, the at least one dispensing member 200 may be re-usable to be removeable and reattachable from a first feeder to a second feeder. In other embodiments, the at least one dispensing member 200 may comprise a one-use configuration. The hangar member 124 may in some cases be removeable and reattachable from a first feeder 100 to a second feeder (not shown).

Figure 8:
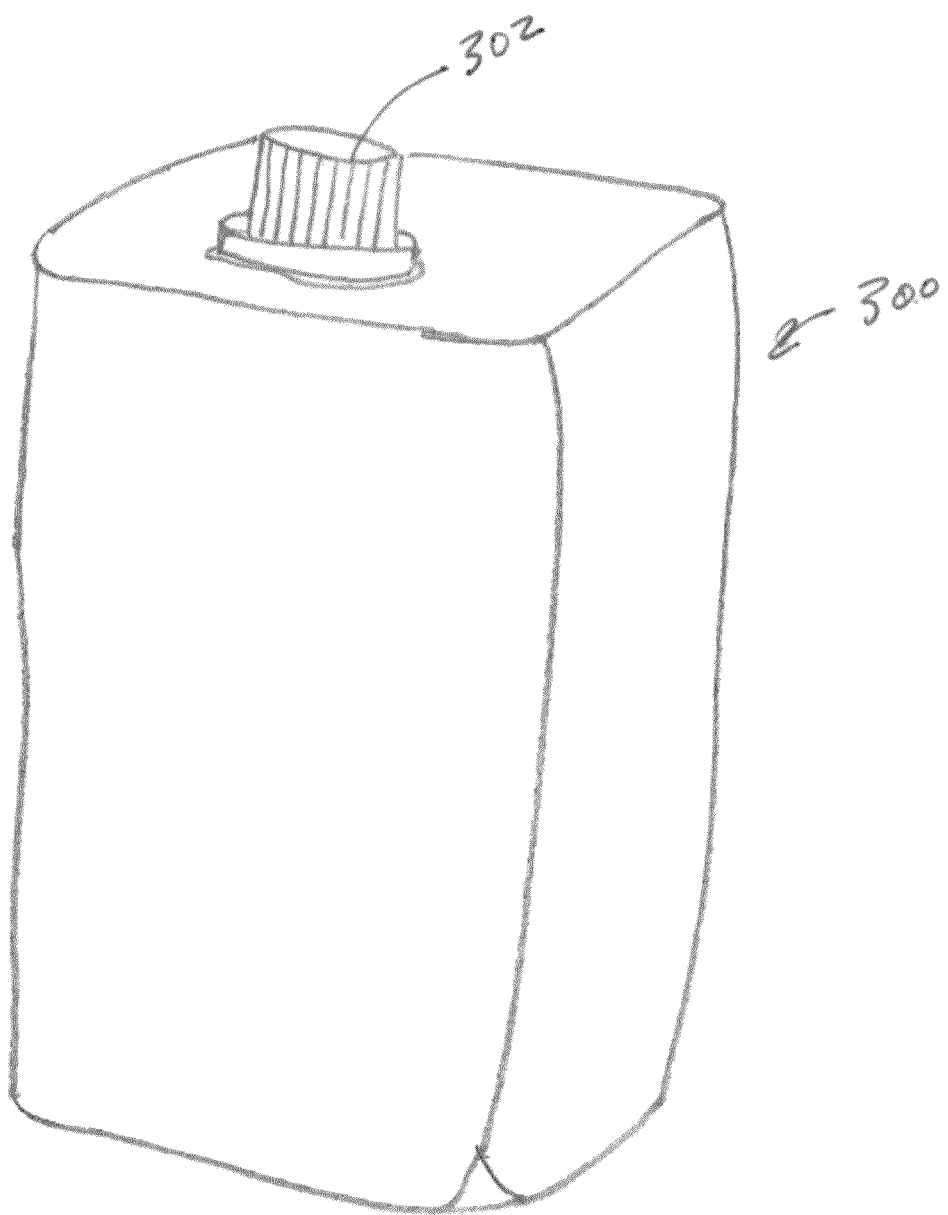
FIG. 8 is a perspective view of a refill package.
Figure 1:
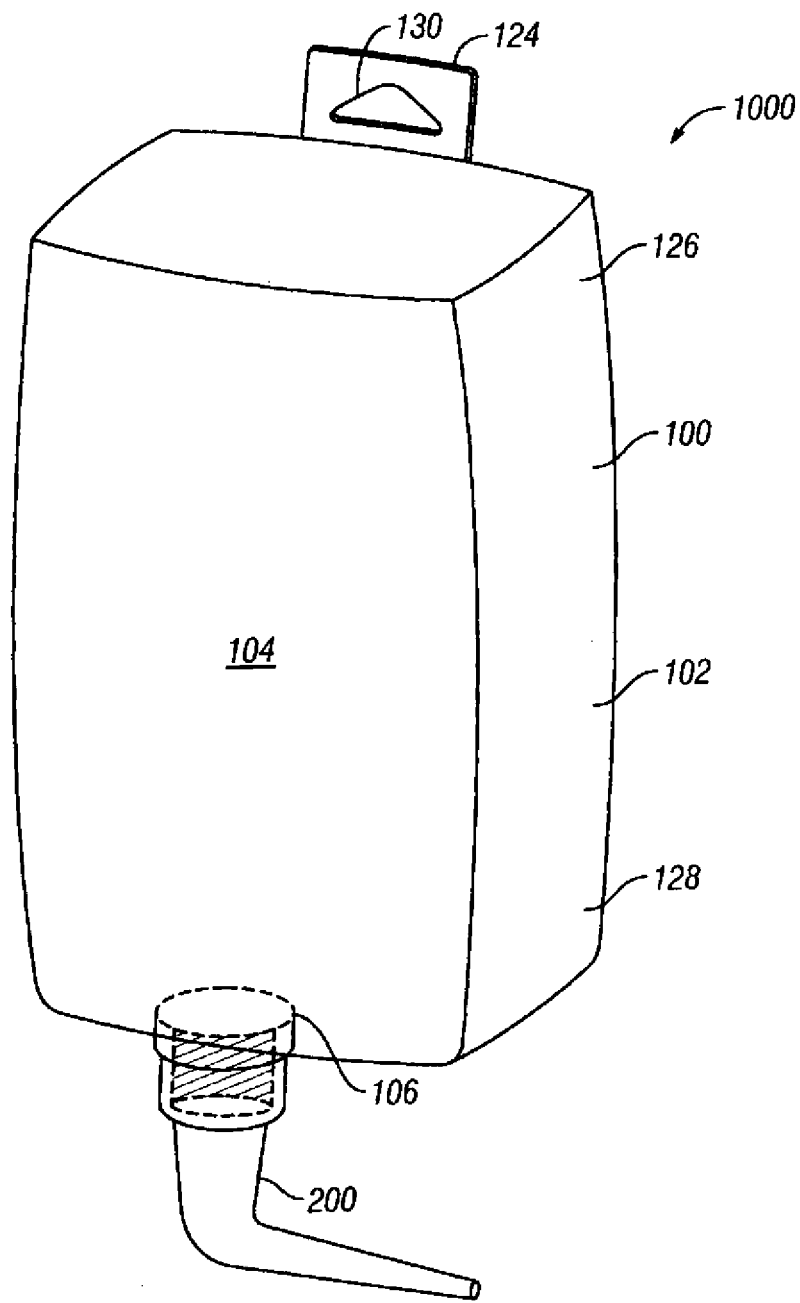
Figure 2A:
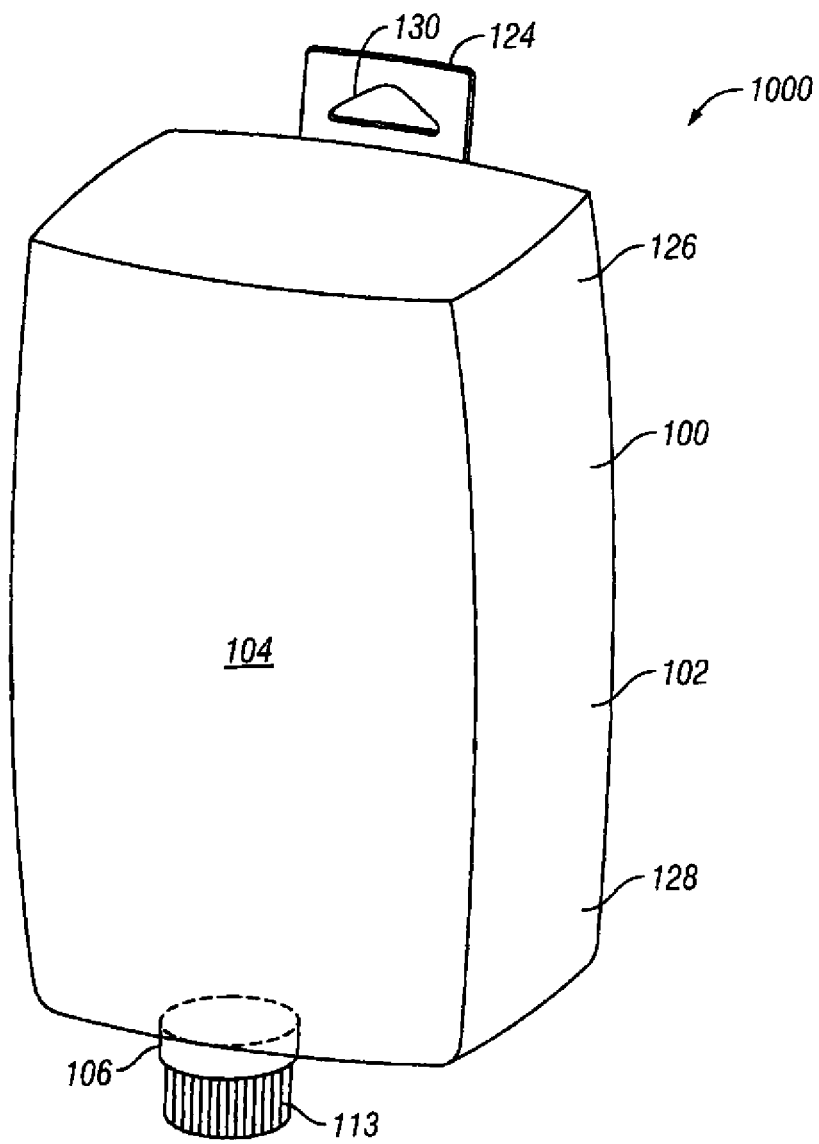
Figure 2C:
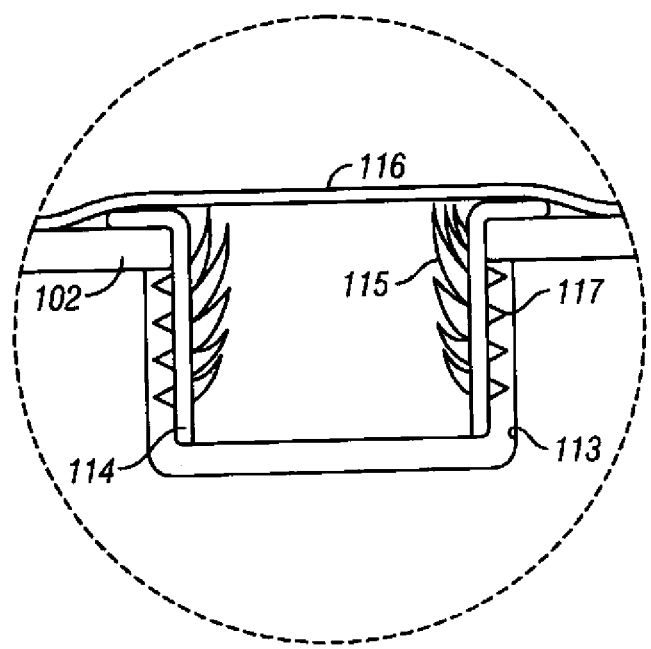
Figure 3:
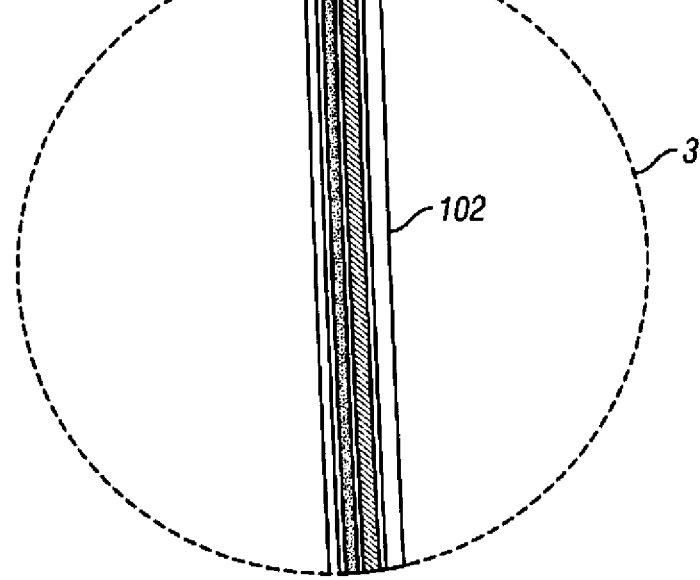

In other embodiments, the system 2000 may comprise one or more refill packages 300, as shown in FIG. 8. Such refill packages may be constructed according to the specifications of the feeder 100, including use of the methods and materials of the Tetra-Pak carton, for example, except that the refill packages 300 may not include the features of the feeder 100 provided for use as a hummingbird feeder, including the hangar member 124 and the dispensing member 200. The refill packages 300 may include a cap 302 that covers an opening. The cap may be removeable for opening the package 300 and accessing the feed solution stored inside. The refill packages 300 may be included in the system 2000 for refilling the reservoir of feeders 200 that are sold with a dispensing member 200 having a re-usable configuration. Alternatively, the refill packages 300 may be sold separately from the system 2000 or the apparatus 1000, as a refill option for consumers seeking to fill conventional hummingbird feeders.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

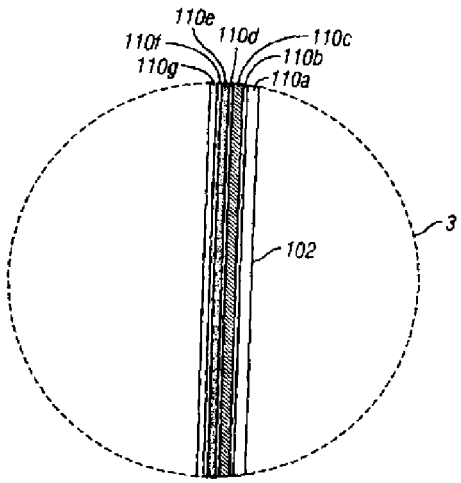

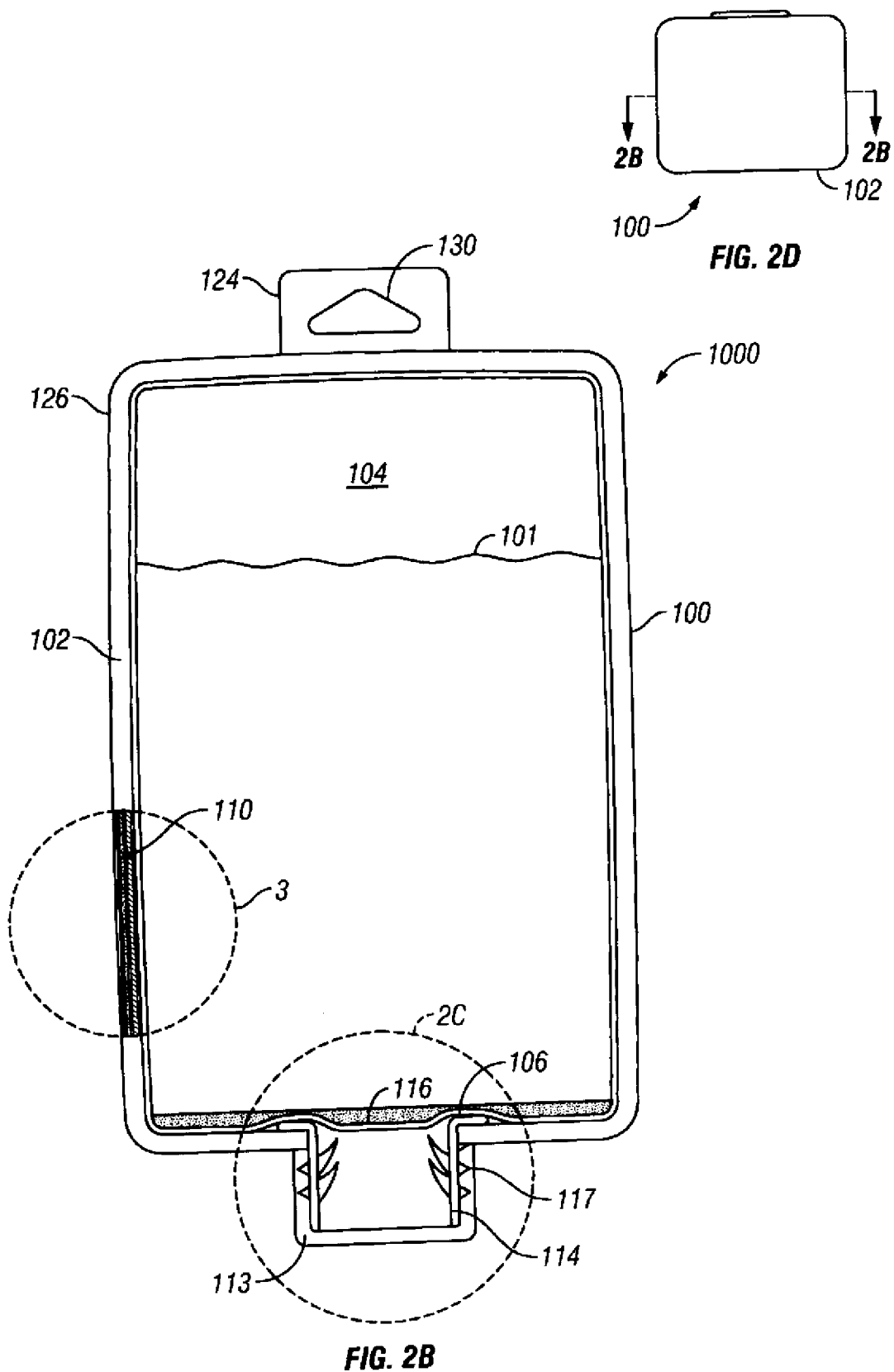

I claim:

1. A hummingbird feeding apparatus comprising:
   a reservoir for providing a ready-to-consume and preservative free feed solution to hummingbirds, wherein walls of the reservoir comprise at least a first layer comprising a barrier to light, oxygen, and flavor enclosing the feed solution in a substantially sealed environment;
   an attachment member coupled to a first portion of the reservoir for attaching the reservoir to a hummingbird accessible location; and
   a dispensing member coupled to an opening in the reservoir for dispensing a feed solution to hummingbirds in response to actuation of the dispensing member; and
   wherein the first layer comprises aluminum, and wherein the reservoir comprises a second layer selected from a paper layer and a plastic layer.

2. The hummingbird feeding apparatus of claim 1, wherein the dispensing member comprises a valve for regulating the flow of feed solution to hummingbirds accessing the feeding apparatus.

3. The hummingbird feeding apparatus of claim 2, wherein the valve comprises a nozzle member.

4. The hummingbird feeding apparatus of claim 3, wherein the valve substantially prevents the flow of feeding solution out of the valve, when the valve is in an undisturbed state.

5. The hummingbird feeding apparatus of claim 1, wherein the feeding solution is substantially sterile.

6. The hummingbird feeding apparatus of claim 5, wherein the feeding solution comprises a water and sugar mixture, and wherein the water and sugar mixture is substantially free from additives.

7. The hummingbird feeding apparatus of claim 1, wherein the attachment member comprises a tab extending from the first portion of the reservoir, and wherein the tab comprises an aperture for receiving a hook for hanging the feeding apparatus at a hummingbird-accessible location.

8. The hummingbird feeding apparatus of claim 1, wherein the walls of the reservoir are flexible for folding the material into generally an enclosed shape.

9. A hummingbird feeding apparatus, comprising:
   a reservoir for providing a ready-to-consume and preservative free feed solution to hummingbirds, wherein walls of the reservoir comprise at least a first layer comprising a barrier to light, oxygen, and flavor enclosing the feed solution in a substantially sealed environment;
   an attachment member coupled to a first portion of the reservoir for attaching the reservoir to a hummingbird accessible location; and
   an interface extending from an opening in the reservoir, wherein the interface is configured to couple to a dispensing member for dispensing feed solution to hummingbirds in response to actuation of the dispensing member; and
   wherein the first layer comprises aluminum, and wherein the reservoir comprises a second layer selected from a paper layer and a plastic layer.

10. The hummingbird feeding apparatus of claim 9, wherein the interface comprises a boss having threading configured to engage threading on a dispensing member.

* * * * *

UNITED STATES PATENT AND TRADEMARK OFFICE
CERTIFICATE OF CORRECTION

PATENT NO. : 8,387,567 B1  
APPLICATION NO. : 13/092285  
DATED : March 5, 2013  
INVENTOR(S) : David S. Hill Page 1 of 9

It is certified that error appears in the above-identified patent and that said Letters Patent is hereby corrected as shown below:

Title page should be deleted and substitute therefor the attached title page.

In the Drawings

The patent drawing sheets 1 - 9 containing informal Figures 1, 2A, 2B, 2C, 2D, 3, 4A, 4B, 5, 6, 7, and 8 are replaced by the attached patent drawing replacement sheets 1 - 7 containing Figures 1, 2A, 2B, 2C, 2D, 3, 4A, 4B, 5, 6, 7, and 8.

Signed and Sealed this  
Twenty-second Day of April, 2014

Michelle K. Lee  
*Deputy Director of the United States Patent and Trademark Office*

(12) United States Patent
Hill

(10) Patent No.: US 8,387,567 B1
(45) Date of Patent: Mar. 5, 2013

(54) HUMMINGBIRD FEEDING APPARATUS

(76) Inventor: David S. Hill, San Antonio, TX (US)

(*) Notice: Subject to any disclaimer, the term of this patent is extended or adjusted under 35 U.S.C. 154(b) by 0 days.

(21) Appl. No.: 13/092,285

(22) Filed: Apr. 22, 2011

Related U.S. Application Data

(60) Provisional application No. 61/326,736, filed on Apr. 22, 2010.

(51) Int. Cl.
*A01K 7/06* (2006.01)

(52) U.S. Cl. .................................................. 119/72

(58) Field of Classification Search .............. 119/72, 119/72.5, 75, 76, 77, 65, 57.8, 430, 434, 119/435
See application file for complete search history.

(56) References Cited

U.S. PATENT DOCUMENTS

| | | | | |
|---|---|---|---|---|
| 3,125,069 | A * | 3/1964 | Fowler | 119/77 |
| 3,990,403 | A * | 11/1976 | Jacobs | 119/72.5 |
| 4,558,662 | A * | 12/1985 | Peterson | 119/77 |
| 5,353,742 | A * | 10/1994 | Mauritz | 119/77 |
| 6,712,236 | B1 | 3/2004 | McGill | |
| 7,093,562 | B2 | 8/2006 | Smothers | |
| 7,156,050 | B2 * | 1/2007 | Scott et al. | 119/431 |
| 7,565,881 | B2 * | 7/2009 | Smothers | 119/72 |
| 7,748,347 | B2 * | 7/2010 | Richmond | 119/72 |
| 7,958,845 | B2 * | 6/2011 | Gardner | 119/77 |
| 2003/0026164 | A1 | 2/2003 | Klein | |
| 2005/0126503 | A1 | 6/2005 | Fort | |
| 2005/0139645 | A1 | 6/2005 | Shean et al. | |
| 2006/0037544 | A1 | 2/2006 | Hunter | |
| 2009/0188434 | A1 | 7/2009 | McMullen | |
| 2009/0283046 | A1 | 11/2009 | Black | |
| 2010/0192866 | A1 | 8/2010 | McMullen | |

OTHER PUBLICATIONS

Wikipedia; "Aseptic processing"; May 14, 2009, Wikipedia.org.
USA HARDWARE.COM; "Homestead Traditional Gem Disposable Humming bird Feeder, 16 Oz Capacity (Case: 6 Units)"; 2009, USA Hardware, Minneapolis MN.
AMAZON.COM; "Bird Brain 15622 Happy Hummer Window Mounted Hummingbird Feeder –Crackle Glass – Aqua Blue"; http://www.amazon.com/Bird-Brain-15622-Mounted-Hummingbird/dp/B000ZMCTQQ; 2009.
Perky-Pet; "Original Instant Liquid Nectar Concentrate for Hummingbirds"; Perky-Pet Products Co., Denver, Colorado, 2006.
Homestead; "Nectar Gem Reusable Hummingbird Feeder"; Gardner Equipment Company, Inc., Homestead Div., Juneau, Wisconsin, 2003.
Capri-Sun, "Our Drinks –Product range and nutrition information– Capri-Sun"; 2010. http://capri-sun.co.uk/mums/product-info/index.php.
Nature and Home; "Hummingbird King"; Nature and Home, 2009. http://web.archive.org/web/20100417111928/http://www.natureandhome.com/_product_7 . . .
Tetra Pak; "The Future of the Stand-up Pouch and the Evolution of Tetra Wedge Aseptic Fiber Pouch Into New Markets"; Tetra Pak Inc. Vernon Hills, IL ; Nov. 2004.
Homestead; "Nectar Gem Hummingbird Feeding System"; Gardner Equipment Company, 2008; http://web.archive.org/web/20090401105231/http://www.nectargem.com/.
Homestead; "Laboratory Study", Gardner Equipment Company; 2009 http://web.archive.org/web/20090401070358/http://www.nectargem.com/study.html.

* cited by examiner

*Primary Examiner* — Yvonne Abbott

(74) *Attorney, Agent, or Firm* - Carr LLP; Marcus Benavides

(57) ABSTRACT

A hummingbird feeding apparatus for use in providing feed formula to hummingbirds. This may be accomplished by providing a reservoir for holding ready to consume and preservative free nectar formula for hummingbirds. The reservoir may have an opening that is configured to couple to a dispensing member for delivering the formula to hummingbirds. The reservoir may have an attachment member on one end for placing the dispensing member in a hummingbird-accessible location.

10 Claims, 9 Drawing Sheets